United States Patent [19]
Martinez et al.

[11] 3,757,450
[45] Sept. 11, 1973

[54] FISH LURE

[76] Inventors: Antero Martinez; Estrella Martinez, both of 3430 E. 4th Ave., Hialeah, Fla. 33012

[22] Filed: Apr. 10, 1972

[21] Appl. No.: 242,375

[52] U.S. Cl. .................................. 43/35, 43/42.15
[51] Int. Cl. .......................................... A01k 85/00
[58] Field of Search ............... 43/35, 36, 37, 42.02, 43/42.11, 42.15, 42.72

[56] References Cited
UNITED STATES PATENTS

| | | | |
|---|---|---|---|
| 2,295,042 | 9/1942 | Llewellyn | 43/35 |
| 2,238,832 | 4/1941 | Thoren | 43/42.15 |
| 1,241,707 | 10/1917 | Capooch et al | 43/42.72 |

*Primary Examiner*—Louis G. Mancene
*Assistant Examiner*—Daniel J. Leach
*Attorney*—Harvey B. Jacobson

[57] ABSTRACT

A fish impaling and trapping lure embodying interconnected plugs; namely, a forward auxiliary plug providing a small bait or minnow and a complemental rearward main plug representing a larger bait or minnow in pursuit of the smaller minnow. Both plugs are cooperatively linked by a pull responsive shaft or rod means carried in part by the small plug with its rear end portion joined to a second rod or shaft whose rear end is fastened to the nose of the second larger plug. The body and head portions of the main plug are equipped with trapping and impaling hooks carried by resilient spring-connected fingers having free forward ends releasably connected to a keeper ring fixed on the rearward diverging ends of a V-shaped yoke fixed to the rear end of the small minnow.

3 Claims, 5 Drawing Figures

PATENTED SEP 11 1973　　　3,757,450
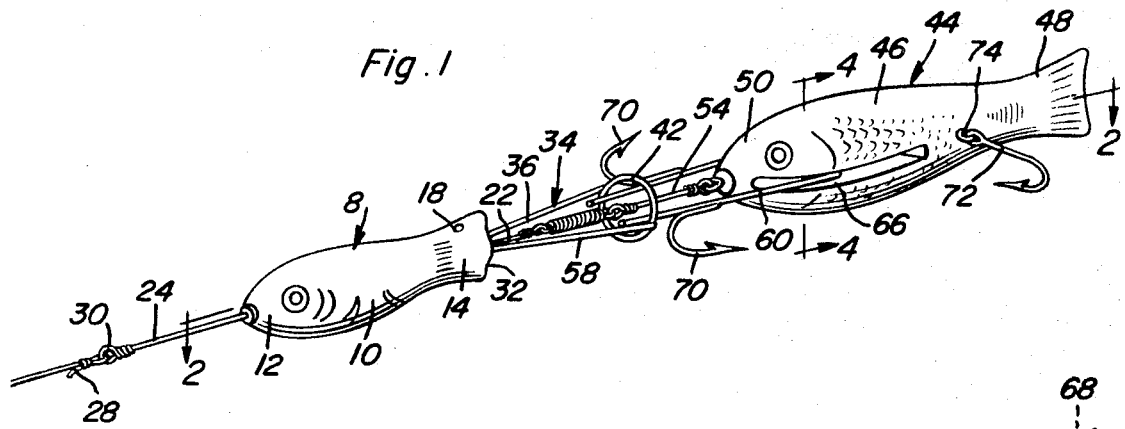
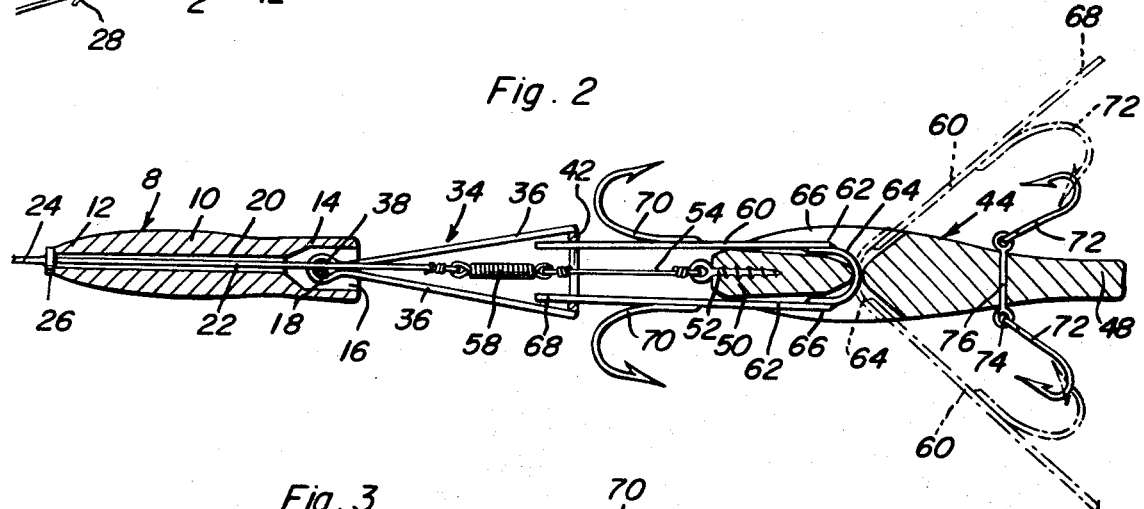
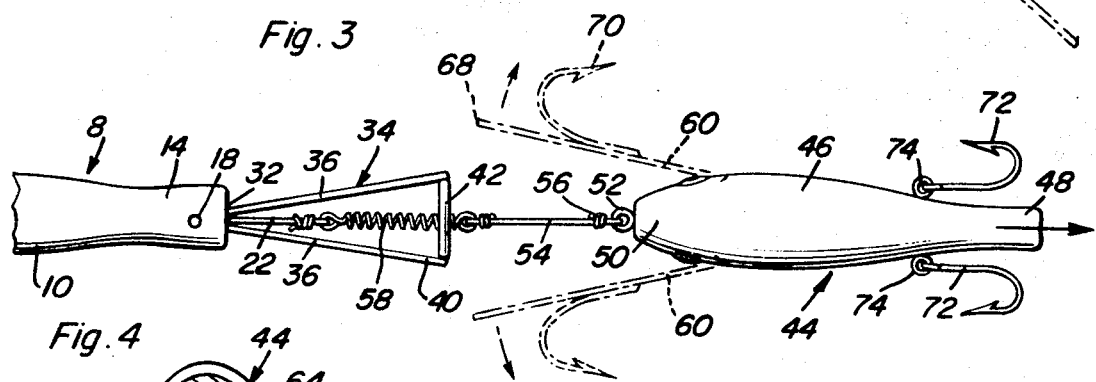
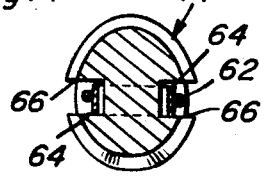
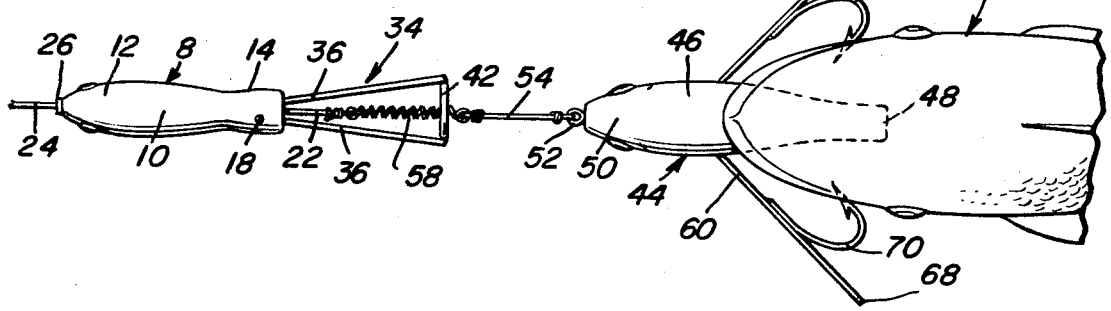

FISH LURE

This invention relates to a pair of artificial bait wherein a main large plug or minnow is linked by spring-loaded pull responsive rod means to a small minnow and which gives a live fish the illusion that the larger minnow is attempting to overtake and devour the small one and wherein novel and spring-actuated trap hooks are carried by the large bait and are normally set in readiness to automatically swing out and then rearwardly in a manner to impale and trap the attacking fish in a now generally well known manner.

An object, generally stated, of the disclosed dual-type lure is to improve upon and simplify the component parts entering into the over-all combination thereby not only increasing the efficiency of the assemblage as a whole, but also rendering the same less costly to manufacture and to otherwise simplify factors of assembling, repairing and sale.

For background purposes the reader, if so desired, may refer to prior U.S. Pat. No. 2,233,684 of Mar. 4, 1941 and U.S. Pat. No. 2,238,832 of Apr. 15, 1941.

Briefly, this innovation has been found to be pleasingly effective when fishing for fish which jump out of the water such as, for example, swordfish and shad. It comprises a leading auxiliary plug or minnow being chased by a larger main minnow. Both minnows are aligned and spaced and, more importantly, linked by companion axially alined spring-joined coacting pull responsive rods or shafts. The rearward end of the small minnow carries a yoke which in turn carries a rigid keeper ring. Yieldable fingers having rearward ends cooperate with diametrically opposite side grooves and a resilient U-shaped spring lodged in the main plug or minnow. The forward free ends of these fingers are normally releasably latched to said keeper ring. Complemental trapping and impaling hooks are fixed to exterior median portions of the fingers in readiness to capture the live victim fish.

These together with other objects and advantages which will become subsequently apparent reside in the details of construction and operation as more fully hereinafter described and claimed, reference being had to the accompanying drawings forming a part hereof, wherein like numerals refer to like parts throughout.

FIG. 1 is a view in perspective of a dual-type fish lure constructed in accordance with the principles of the invention and showing the trapping and impaling hooks in their normal set but releasable position.

FIG. 2 is a view with parts in section and elevation taken approximately on the plane of the section line 2—2 of FIG. 1 looking in the direction of the indicating arrows.

FIG. 3 is a view in top plan showing the trapping and inpaling hooks in phantom lines after having been released with the spring stressed and with the hooks swinging outwardly and rearwardly.

FIG. 4 is a cross section taken approximately on the plane of the vertical section line 4—4 of FIG. 1 with the rear pivoted hooks omitted for clearness of illustration.

And FIG. 5 is a plan view on an appropriate scale showing the trap hooks impaling the live fish.

Taking up the leading or auxiliary first plug it will be noted that it is of any suitable shape, size and materials and is denoted by the numeral 8. As perhaps best shown in FIG. 2 this auxiliary plug has a body portion 10, a head portion 12 and a tail portion 14. The tail portion as best shown in FIG. 2 is recessed to provide a socket 16. It will be noted that a pin 18 is fixed in this tail portion in a manner to bridge the median portion of the socket for a purpose to be described. It will be further noted that this plug 8 is provided with an axial open-ended bore 20 and in actual practice the principal portion of the bore serves to accommodate the main portion of a reciprocable pull responsive rod or shaft 22. It will be further noted, particularly in FIGS. 1 and 2, that a forward end portion 24 of the rod is provided with a fixed limit stop collar 26 which abuts the nose of the plug 8. In addition; as brought out in FIG. 1 the fishing line 28 is suitably tied or connected to a terminal eye 30 on the extending portion 24 of the rod 22. While considering this small minnow or plug it is perhaps advisable to include the means provided at the rear the terminal end portion 32. This means comprises a wire or an equivalent substantially V-shaped yoke 34 having forwardly converging limbs or legs 36 which are joined by way of a connecting eye 38 as brought out in FIG. 2, said eye in turn being pivotally anchored on the aforementioned anchoring pin 18 as best shown in FIG. 2. The rearward diverging or terminal end portions of the legs or limbs of the yoke, that is, the portions 40, are connected to and carry a fixed keeper ring 42.

With reference now to the trailing relatively large plug it will be noted that it is denoted by the numeral 44 and constitutes the main plug and also represents the larger minnow in pursuit of but spaced from the smaller minnow 8. This lure or plug is also of appropriate size and shape and has a body portion 46, a solid tail portion 48 and a suitable head portion 50. The head portion is provided with a screw eye 52. One end of the pull responsive relatively short rod or shaft 54 is suitably tied or otherwise connected at 56 to the eye 52. The adjacent eye-equipped ends of both rods are connected by an appropriately tensioned coil spring 58 which is normally contracted as shown for example in FIGS. 1 and 2. The impaling and trapping hook means is of simple construction and comprises a pair of opposed coplanar diametrically opposite yieldable fingers of appropriate resiliency denoted at 60. The terminal rear ends 62 are connected with end portions of a U-shaped spring 64 embedded in a portion of slot means formed in the forward and body portions of the main plug 44 as best shown in FIG. 2. Portions of the fingers are seated in the side slots 66 and the forward end portions are free as at 68 and are normally releasably connected with the aforementioned keeper ring 42. The median exterior portions of the releasable fingers are connected with suitable fishhooks 70 which are constructed and arranged to swing from the position shown in FIGS. 1 and 2, to the variable positions shown in FIG. 3 and then finally to the trapping positions shown in FIG. 5.

In operation, when the live fish takes the bait a pull on the fishing line exerts a consequent pull on the rod means 22 and 54 and strains or stretches the coil spring 58 with the result that the free releasable or latched ends of the two fingers 60 are released whereupon the fingers swing out to the dotted line positions shown in FIG. 3 and then finally rearwardly backwardly and inwardly to make the catch shown in FIG. 5.

It is within the purview of the invention to provide an additional pair of hooks 72 in the tail portion and to connect these to eyes 74 on a rod or pin 76 fixed transversely across the tail portion.

According to several observations made through glass on fish schools, it has been observed that fish are always alert to attack those not so alert. Several tests have confirmed that this bait succeeds twice as often as a single bait.

This artificial bait has two advantages. Besides being composed of two baits, it has four hooks, two in the tail and two in the head, which are thrown backwards to capture the live fish by the head. These two hooks are kept in place within the keeper ring 42. As soon as the ends 68 leave the ring 42, they will strike the head of the live fish as shown. This result happens when the bait is attacked.

The foregoing is considered as illustrative only of the principles of the invention. Further, since numerous modifications and changes will readily occur to those skilled in the art, it is not desired to limit the invention to the exact construction and operation shown and described and accordingly all suitable modifications and equivalents may be resorted to, falling within the scope of the invention.

What is claimed as new is as follows:

1. A fish lure comprising a relatively small auxiliary plug constituting a first minnow and having an open-ended longitudinal axial bore extending therethrough, a complemental relatively large main plug trailing and spaced from said small plug and constituting a second minnow trailing said first minnow and coupled thereto to give the impression of chasing and attempting to capture said first minnow, a first shaft slidingly mounted in said axial bore and of a length greater than the length of said bore and auxiliary plug and having a forward end to which the rear end of a fishing line is operatively connectible and a rearward end projecting beyond the corresponding rearward end of said auxiliary plug, a second shaft aligned with said first shaft and having a rearward end operatively connected to a forward end of said main plug, and a normally retracted but extensible and retractable coil spring cooperatively aligned with and joining adjacent spaced ends of said shafts, said main plug being provided with a pair of diametrically opposite permanently mounted outstanding pivoted fishhooks located forwardly of but adjacent to a tail end of the plug, the forward head portion of said main plug being provided with paired simultaneously retractable and projectable trap-type hooks which are cooperatively joined and spring biased, means carried by the rearward tail portion of said auxiliary plug by way of which said trap-hooks are normally held in a retracted but ready-to-impale position, said means comprising a V-shaped yoke whose forward converging ends are pivotally connected to a rearward tail end of said auxiliary plug and whose rearward diverging ends are connected to and provided with a fixed keeper ring with which coacting end portions of said trap hooks are releasably connected.

2. A fish impaling and trapping lure comprising, in combination, a relatively small auxiliary plug constituting a first minnow having body, head and tail portions, said tail portion having a rearwardly opening axial socket, a substantially V-shaped yoke having forward converging legs integrally joined by a connecting bight portion, said bight portion being pinned and movably pivoted in a portion of said socket, a keeper ring axially aligned with and spaced rearwardly from said socket, said legs having rear diverging ends straddling and fixed to and anchoring said keeper ring in a predetermined locale, a relatively large main plug constituting a second main minnow trailing said first minnow and spaced from and located relative to the tail of the first minnow that it gives a pursuing live fish the impression that a chase is under way to catch and devour the first minnow, surface portions of the head and body portions of said main minnow having slot means therein, a U-spring lodged and anchored in said slot means, a pair of resilient fingers having rear ends fixed to coacting free ends of said U-spring and having free forward ends releasably latched to said ring, and impaling fishhooks fixedly anchored on exterior median portions of the respective legs, said legs when tripped and freed being adapted to automatically swing outwardly and rearwardly to hook-positioning live fish impaling positions, and pull responsive shaft means carried by and operatively connecting said minnows.

3. The fish impaling and trapping lure defined in and according to claim 2, and wherein said pull responsive shaft means comprises forward and rearward shafts, said forward shaft being slidingly and operatively mounted on said auxiliary plug, said rearward shaft having a rearward end operatively anchored on the forward axial end of said main plug, and a coil spring interposed between and connecting adjacent ends of said shafts.

* * * * *